United States Patent

[11] 3,601,068

| [72] | Inventors | Charles P. Ciaffone<br>Sturbridge, Mass.;<br>Charles A. Richmond, Montclair, N.J.;<br>Arthur W. Grahame, Jr., West Hempstead, N.Y. |
|---|---|---|
| [21] | Appl. No. | 858,632 |
| [22] | Filed | Sept. 17, 1969 |
| [45] | Patented | Aug. 24, 1971 |
| [73] | Assignee | Nichols Engineering & Research Corporation<br>New York, N.Y.<br>by said Richmond |

[54] SYSTEM AND PROCESS FOR CONVEYANCE AND INCINERATION OF WASTE MATERIAL
4 Claims, 2 Drawing Figs.

[52] U.S. Cl. .................................................. 110/8 R
[51] Int. Cl. .................................................. F23g 5/00
[50] Field of Search .................................................. 110/7, 8, 15

[56] References Cited
UNITED STATES PATENTS

| 3,304,894 | 2/1967 | Cox et al. | 110/15 |
| 3,387,574 | 6/1968 | Mullen | 110/7 |
| 3,453,976 | 7/1969 | Burden, Jr. et al. | 110/7 X |

*Primary Examiner*—Kenneth W. Sprague
*Attorney*—Thomas B. Graham

ABSTRACT: A process for conveying and incinerating waste material which comprises subjecting the waste to pneumatic pressure so as to convey it through a connecting pipe to an incinerator and an apparatus directed thereto which comprises means for receiving the waste; a pneumatic ejector situated beneath the receiving means, which is a generally cylindrical vessel terminating in a conical bottom section, having an inlet valve suitable for closing off the inlet to make the vessel airtight, and an air inlet for admitting compressed air to the ejector, the air inlet being connected by a pressure air line to a control panel which, in turn, is connected to a source of compressed air; and a discharge pipe leading from the bottom of the ejector to an incinerator and connected thereto by means of a flared adapter.

Patented Aug. 24, 1971
3,601,068
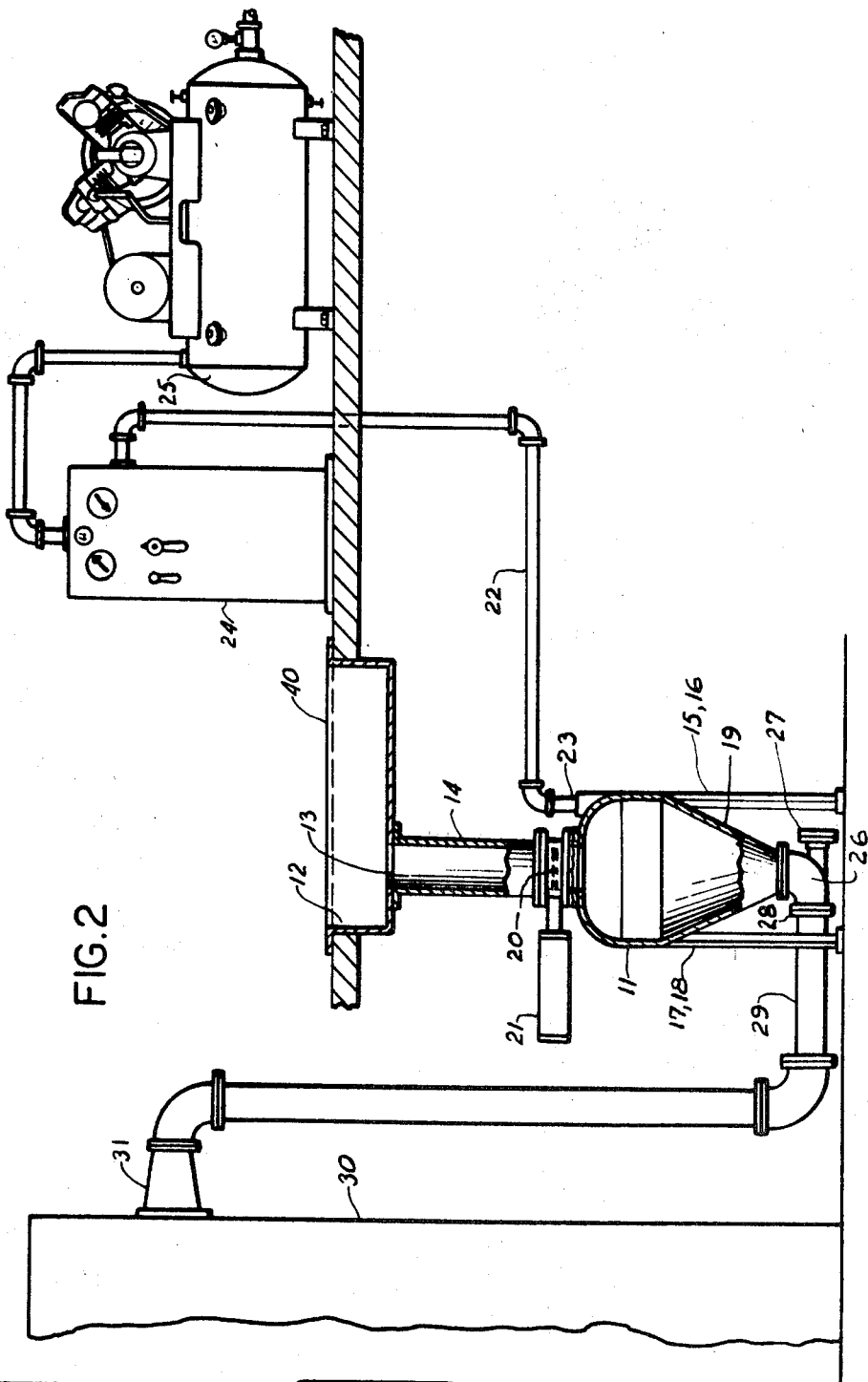
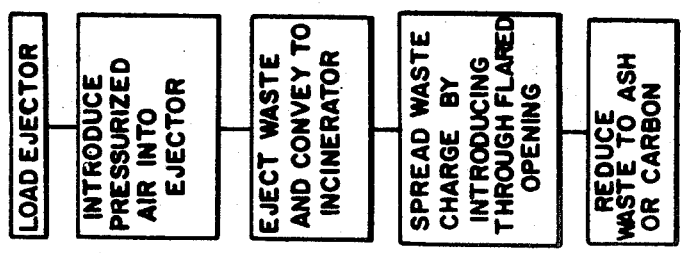

SYSTEM AND PROCESS FOR CONVEYANCE AND INCINERATION OF WASTE MATERIAL

BACKGROUND OF THE INVENTION

In a sewage treatment plant, various types of waste are encountered including coarse unground screenings, unwashed grit and organic matter, sludge and skimmings. The initial operation in separating and isolating this waste involves the screening out of coarse material which is referred to as "sewage screenings" as well as the collection of "grit," such as sand. The sludge component of the sewage is collected by sedimentation and filtration. It has been a recent development in the art to dispose of this collected waste by incineration as opposed to the outmoded approach of burying the waste.

However, the incineration of waste has raised numerous problems which relate primarily to the handling, temporary storing and transporting of the wet and bulky waste material. Thus a typical procedure has involved scraping the waste from the collecting screens, manually or pneumatically conveying it to bins for temporary storage and then feeding it into the incinerator by means of a hydraulic ram, a screw, a specially designed plow, or a comparable piece of apparatus. It is to be observed that this procedure is a cumbersome, time-consuming and inefficient one which requires several loading and unloading operations, manual assistance, considerable maintenance, and, occasionally, the installation of additional machinery. Conveyance of this material to the incinerator is rendered even more difficult in view of the bulk of the waste solids and their wet condition. Furthermore, the open nature of this operation makes no allowance for control over the sanitary condition thereof as well as over the odor emanating therefrom.

The method which is presently being utilized for conveying sludge cake to an incinerator is particularly illustrative of the inefficiencies inherent in such handling and conveying methods. Thus, the caked product which results from the vacuum filtration of sludge in initially mixed with lime in order to reduce its odor and potential health hazard, these problems being of critical concern in such an open conveyance system. The sludge cake is then loaded on a conveyor belt system for transfer to the elevated entrance of the incinerator. The belt system has a large space requirement and is often intricately designed inasmuch as the incline of the belt cannot exceed about 25°–30° without inducing slippage and loss of the conveyed material.

Similar problems are encountered in the conveyance and disposal of other types of waste. These include, for example, skimming and digestive scum in sewage waste, hospital waste, animal waste, refuse, garbage, wood bark, sawdust, waste plastics and the like. Of particular concern in the disposal of hospital waste, which may range from dead laboratory animals to syringes and bandages, is the pathological danger of spreading disease during the open disposal operation.

SUMMARY OF THE INVENTION

It is thus the prime object of this invention to provide a process for conveying and incinerating waste which substantially overcomes the difficulties inherent in the prior art procedures.

It is a further object of the invention to provide a fully enclosed apparatus for conducting this process which will, simultaneously, vastly improve the sanitary conditions of the conveying operation.

Other objects and advantages of this invention will be readily apparent from the following description thereof.

We have now, surprisingly, discovered that it is possible to use air pressure to pneumatically convey waste materials, i.e. screenings, grit, sludge cake, skimming, hospital waste, refuse, garbage, bark, plastics and the like, from a collecting chamber to the incinerator within a closed system. Thus, the basic approach consists of conveying the waste by air pressure and spreading the waste charge as it enters the incineration zone. As a result, the practitioner is now able to eliminate the need for bins, hoppers, hydraulic rams, screw feeders, conveyor belts, and the like between the ejector and the incinerator. He is also able to convey waste over long distances and to elevate it to substantial heights.

It is to be noted that the novelty of this approach is magnified when viewed in light of the prevailing opinions in the art. Thus, it has been maintained by experts in the art that such an approach was not feasible for such reasons as: (1) the air pressure would create excessive turbulence in the incinerator thereby causing "puffing" and "smoking" problems; (2) the air pressure would cause a significant increase in the absolute pressure of the incinerator chamber, thereby changing the combustion characteristics of the incinerator; and (3) the use of air pressure to convey grit to the incinerator would cause a "sandblasting" effect upon the internal sections of the incinerator. Needless to say, these potential difficulties are avoided by our novel process.

In accordance with this process, we have constructed a closed system for use in conveying and incinerating waste material, this system providing efficient conveying conditions as well as substantially sanitary and odorless operation. Thus, the use of a pneumatic ejector in conjunction with a receiving means, discharge pipe and incinerator, as a means for collecting the waste and subjecting it to air pressure so as to convey it to the incinerator provides for an efficient, rapid system which limits the manual operation to one loading and unloading step. By keeping the line sealed in transferring the waste up to a high level and into the incinerator, movement, transfer and discharge of the waste into the incinerator is accomplished. Furthermore, the use of a flared adapter as the connection between the discharge pipe and the incinerator serves to spread the charge as it is inserted into the incinerator, thereby increasing the efficiency of the incineration. The closed system also allows the operation to be performed sanitarily and confines the odor which is inherent in handling such waste to make the whole operation substantially odor free; the latter improvements being of special importance in the handling and disposal of sewage and hospital waste.

DESCRIPTION OF THE PREFERRED EMBODIMENT

Our invention will be better understood from the following detailed description thereof together with the accompanying drawings in which:

FIG. 1 is a flow diagram depicting the path taken and the process steps encountered by the waste in accordance with this invention; and, FIG. 2 is a front view of a typical apparatus of the invention depicting its several component parts and the relationship of these parts and including a cross-sectional view of the pneumatic ejector.

Referring now to FIG. 2, the apparatus of this invention depicted therein comprises a receiving tray 12 which contains on opening 13 therein leading directly into the inlet chute 14 of the pneumatic ejector 11. The pneumatic ejector 11 is supported by vertical legs 15, 16, 17, 18, four being a usual quota for a device of this size. The legs are integrally joined to a conical section 19 of the ejector. The top of the ejector 11 consists of an inlet chute 14 carrying an inlet valve. The inlet valve 20 serves to close off the inlet 14 and thereby make the vessel airtight. Among the applicable inlet valves are included knife gate valves and flap valves. The knife gate valve is preferred because on opening, a clear, straight channel is made available. It may be pneumatically, hydraulically, electrically, or mechanically operated by any suitable external arrangement indicated by the inlet chute valve housing 21.

A pressure air line 22 connects to air inlet 23 to supply compressed air to the system. The pressure air line 22 is also connected to a control panel 24 which in turn is connected to a source of compressed air 25. The control panel 24 may be so designed as to either automatically or manually control the introduction of the compressed air into the ejector.

The bottom of the conical section 19 of the ejector 11 connects to an elbow 26 equipped with a cleanout plug 27, joining by means of a flange 28 with a discharge pipe 29.

The discharge pipe 29 may be of any suitable length. It leads to the incinerator 30 wherein the screenings are reduced to ash and/or carbon. The pipe 29 is generally characterized by a shape which extends horizontally from the bottom of the ejector, rises to the entrance of the incinerator and then proceeds horizontally to connect with the incinerator. In this manner, the most efficient conveyance of the waste material is achieved. Thus, when the waste is compacted in the ejector and the first horizontal section as well as when it passes through the vertical section it is necessarily present in a compact, tightly knit unit which can be acted upon by the full force of the pressurized air and thereby lifted to the requisite height. I contrast, when the waste is dispersed through greater areas of the discharge pipe, the air is diffused among the separated particles and a concurrent diminution in the applied air pressure conveying the total charge is experienced.

At the entrance of the incinerator, the discharge pipe 29 is connected to the incinerator by means of a flared adapter 31, the flared entrance serving to spread the charge and thereby insure a rapid, uniform incineration. It is to be noted that the flared adapter may be positioned wholly outside, partially outside or wholly inside the incinerator.

The process of this invention and the concurrent operation of the specified apparatus is generally described in the flow diagram of FIG. 1. Thus, the collected waste is passed into the inlet chute of the ejector with the inlet valve open. When the waste is compacted in the conical section of the ejector, the inlet valve is closed and air under pressure is forced into the ejector through the air inlet. The pressure within the vessel is allowed to build up to an appropriate level so as to overcome the force represented by the mass of the waste material whereupon this compacted mass is blown out through the discharge pipe to be deposited into the incinerator. Based upon the pressure of air applied, the waste can be lifted and delivered over any reasonable distance to the incinerator; heights of up to about 100 feet and distances of up to 2,000 feet being practical for purposes of this invention. As previously indicated, the waste material is introduced into the incinerator through a flared opening in order to spread the charge. The waste is reduced into a light, sterile ash and/or carbon residue which represents a reduction of approximately 95 percent from the original volume of waste solids and which is collected at the base of the incinerator and utilized for any conventional application such, for example, as land fill.

Any incinerator conventionally used for burning wastes may be utilized in conjunction with the apparatus of this invention. Typical of such incinerators is the multiple-hearth furnace which has the facility for the simultaneous burning of sludge, screenings and grit, etc. When utilized in the apparatus of this invention, the incinerator receives the ejected waste from the discharge pipe in one of its chambers. The chamber is equipped with rotating arms which agitate and rotate the conveyed waste so as to continually expose a maximum amount of surface thereof until it is totally reduced to ash and/or carbon and then direct the residue toward an opening in the floor of the chamber wherein it drops to the chamber below.

Actual experience in the handling of the waste solids at any particular plant will indicate the precise process variables to be utilized such as the volume of waste fed to the ejector, the pressure required to adequately eject the waste and the sizes and dimensions of the discharge pipe, elbows and other hardware. In general, the operational ejector ranges in size from about 1 to 500 cubic feet, while the pressure utilized to eject the waste may range from about 5 to 100 pounds per square inch.

By way of specific illustration of the process of this invention utilizing the specified apparatus, a 3-cubic-foot barrel of waste solids was passed, by means of an inlet chute, into a four cubic foot experimental ejector. Thereafter, the ejector inlet valve was closed and the air inlet opened to allow the compressed air to enter the ejector. An air pressure of approximately 5 pounds per square inch was required in order to overcome the force represented by the mass of waste, whereupon the compacted mass was quickly and efficiently ejected into the discharge pipe and conveyed into the incinerator, whereupon it was promptly reduced to ash and carbon. It was noted that this operation was conducted quickly and efficiently under sanitary conditions and with a minimum of noticeable odor. Furthermore undesirable turbulence of the waste in the incinerator was totally avoided in view of the spreading of the waste charge as a result of its entrance into the incinerator through the flared opening as well as of the low ejection force utilized in the operation.

It is to be noted that multiplicity of ejectors may be utilized in the apparatus of the invention. Thus, a greater continuity of operation may be achieved by connecting several ejectors to the discharge pipe. Furthermore, a large ejector may be situated above a smaller ejector, thereby functioning as a storage and feed unit. This arrangement allows for the dumping of large quantities of waste and increases the efficiency of the loading of the primary ejector. In addition, in the disposal of sludge cake, means may be provided for automatically transferring the cake from the vacuum filter to the ejector.

The flared discharge connection (31 in FIG. 2) is preferably about 6 to 10 pipe diameters in length and at the mouth of the discharge it is about 1½ to 2 pipe diameters across. It may be circular or polygonal in periphery at the discharge mouth. The basic pipe for setting these dimensions is the discharge pipe 29 and these others are multiples thereof. As pointed out the discharge connection may be fully or partially enclosed in the incinerator.

Accordingly, while the invention has been described in terms of the specific embodiments herein, it should be apparent that variations thereof may be developed without departing from the spirit or scope of this invention.

What is claimed is:

1. A process of conveying and incinerating waste which comprises the steps of: (1) collecting the waste in a pneumatic ejector in the form of a compacted slug; (2) subjecting the compacted waste to sufficient air pressure so as to overcome the force represented by the mass of the waste and forcibly eject it into and convey it through a discharge pipe leading to an incinerator, said waste being substantially retained in its compacted state during said ejection and conveyance; (3) spreading the waste charge as it enters the incineration zone; and (4) reducing the waste to ash and/or carbon.

2. The process of claim 1, wherein said air pressure applied to said waste ranges from about 5 to 100 pounds per square inch.

3. A primary sewage treatment system for the conveyance and incineration of sewage waste which comprises (1) a supported receiving means with an opening therein situated directly above (2) the inlet chute of a vessel terminating in a conical section, said vessel having a closure valve for closing the top thereof, and an air inlet adjacent to said inlet chute for introducing air under pressure into said vessel, said air inlet being connected to a source of said pressured air through means for controlling the introduction of said air, (3) a discharge pipe connected to the bottom of the conical section of said vessel, said discharge pipe extending horizontally from the vessel bottom, then rising to and connecting with (4) an incinerator, said discharge pipe being connected to said incinerator by means of a flared adapter; the introduction of the pressurized air into said vessel being such that the contents of the vessel are forcibly ejected under pneumatic pressure into the discharge pipe and conveyed to said incinerator.

4. The apparatus of claim 3, wherein said flared adapted is situated wholly outside the incinerator.